United States Patent
Wen

(10) Patent No.: US 8,959,691 B2
(45) Date of Patent: Feb. 24, 2015

(54) WEAVING METHOD OF THREE-DIMENSIONAL VAMP

(71) Applicant: Long John Tsung Right Industrial Co., Ltd., Chang-Hwa (TW)

(72) Inventor: Wen-Tsao Wen, Chang-Hwa (TW)

(73) Assignee: Long John Tsung Right Industrial Co., Ltd., Pei-Tou Chang-Hwa (TW)

( * ) Notice: Subject to any disclaimer, the term of this patent is extended or adjusted under 35 U.S.C. 154(b) by 319 days.

(21) Appl. No.: 13/679,468

(22) Filed: Nov. 16, 2012

(65) Prior Publication Data

US 2014/0082905 A1 Mar. 27, 2014

(30) Foreign Application Priority Data

Sep. 25, 2012 (TW) .............................. 101135032 A

(51) Int. Cl.
| | | |
|---|---|---|
| A43B 23/00 | (2006.01) | |
| D03D 3/02 | (2006.01) | |
| D03D 15/00 | (2006.01) | |
| D06C 7/00 | (2006.01) | |
| D06H 7/00 | (2006.01) | |
| D04B 21/16 | (2006.01) | |
| D06C 5/00 | (2006.01) | |
| D06C 7/02 | (2006.01) | |
| A43B 1/04 | (2006.01) | |
| A43B 23/02 | (2006.01) | |
| A43B 23/04 | (2006.01) | |
| B29D 35/12 | (2010.01) | |

(52) U.S. Cl.
CPC .................. *D03D 3/02* (2013.01); *D03D 15/00* (2013.01); *D06C 7/00* (2013.01); *D06H 7/00* (2013.01); *D04B 21/16* (2013.01); *D06C 5/005* (2013.01); *D06C 7/02* (2013.01); *A43B 1/04* (2013.01); *A43B 23/0215* (2013.01); *A43B 23/042* (2013.01); *B29D 35/126* (2013.01)
USPC ....................................... 12/142 R; 12/142 G

(58) Field of Classification Search
USPC .................... 36/9 R; 12/142 R, 142 G, 146 C
See application file for complete search history.

(56) References Cited

U.S. PATENT DOCUMENTS

| | | | |
|---|---|---|---|
| 2,440,393 A * | 4/1948 | Clark ........................... | 12/142 G |
| 2,467,237 A * | 4/1949 | Sherman et al. ............. | 12/142 G |
| 2,641,004 A * | 6/1953 | Ronyan et al. ............... | 12/142 G |
| 8,701,232 B1 * | 4/2014 | Droege et al. ................ | 12/142 R |
| 2012/0255201 A1 * | 10/2012 | Little ................................ | 36/84 |
| 2013/0269211 A1 * | 10/2013 | Deans et al. ....................... | 36/84 |

* cited by examiner

*Primary Examiner* — Marie Bays
(74) *Attorney, Agent, or Firm* — Saliwanchik, Lloyd & Eisenschenk

(57) ABSTRACT

A weaving method of a three-dimensional vamp includes the steps of: weaving yarn by a warp-knitting machine to form a top vamp by a first part needle bar of the warp-knitting machine which is interactively woven with a bottom vamp formed by a second part needle bar of the warp-knitting machine so as to form a tube-shaped fabric; cutting the tube-shaped fabric to form a sock-shaped fabric; disposing the sock-shaped fabric on a shoe last; and heating the sock-shaped fabric to tighten the sock-shaped fabric in order to seal the shoe last and consequently obtain the three-dimensional vamp. The heat shrinkable and irreversible properties of a high shrinkage yarn or hot melt yarn are used to seal the sock-shaped fabric with the shoe last, thereby achieving the substantial physical properties. The turner cost and the fabric flotsam can be reduced by the process of manufacturing the integrally formed vamp.

5 Claims, 4 Drawing Sheets

WEAVING METHOD OF THREE-DIMENSIONAL VAMP

CROSS-REFERENCE TO RELATED APPLICATION

This application claims the benefit under 35 U.S.C. §119 of Taiwanese Patent Application No. 101135032, filed Sep. 25, 2012, which is hereby incorporated by reference in its entirety.

BACKGROUND OF THE INVENTION

1. Field of the Invention

The present invention relates to a weaving method, and more particularly to the weaving method of a three-dimensional vamp that forms a vamp and a sole integrally which saves on the labor cost of cutting fabric and sewing whist achieving the effect of environmental protection.

2. Description of Related Art

As our living standard improves, people have increasingly more diversified requirements on shoes, so that various different models of shoes are introduced to meet market requirements. In most traditional shoe making methods, various shoe fabrics such as leathers or jacquard fabrics are cut first, and then materials at different parts of a vamp are sewed, and finally a sole laying process is performed to combine the vamp with a sole. In the entire shoe making process, the labor of cutting materials and sewing parts occupies approximately 65% of the labor cost, and the remaining 35% of the labor are used for laying the sole and form the whole sole. Therefore, the cutting and sewing of materials occupy much of the labor cost of the entire shoe making process.

Present shoe making processes still require improvements. For example, the material cutting process requires a mold for cutting materials for each template and size, and thus incurring a significant cost. After the shoe material is cut, the remaining useless flotsam occupies approximately 20% of the total shoe fabrics. In other words, while the flotsam is destroyed, not only a relatively large portion of the shoe material cost is wasted, but a relatively large burden is also created on the environment.

On the other hand, the sewing portion is the most important part of the present shoe making process. Since the portion of combining the vamp with the sole requires fine sewing, therefore if a slight error is made at any part of the stitches, it will make a big difference to the comfort of wearing the shoes. In addition, regardless of precise the template and the mold design of the shoes may be, errors may still occur during the sewing process which affects the originally cut size of the shoes, and thus we come to know the importance of a precise sewing technology. The difference in skill mastery between a novice and an experienced maker will also affect the quality of the shoes. Obviously, finding a way of overcoming the inconsistent sewing quality is one of the difficult issues for the present shoe-making industry.

To meet the huge demand of the shoe market, a large labor force is required to cope with the labor intensive industry, and thus major shoe manufacturers generally have tens of thousands of employees, and shoe factories are gradually built in developing countries instead of developed countries to seek for a cheaper labor force. However, as the labor force starts fighting for their rights and benefits, disputes between employers and employees occurs frequently, and even conflicts and strikes occur from time to time. Therefore, it is necessary to transform the way of making shoes from the traditional hand-making and sewing into automated production.

In present shoe industry, automated processes include mold preparation, injection molding and large sole attachment, but the process of weaving the vamps that requires most labor cost cannot be automated. Since the fabric of the vamp must be wear-resisting and pressure-resisting, therefore the fabric with a yarn diameter of 200~800 deniers is required to achieve a substantial physical property. The fabric of the vamp is produced by a warp weaving method, so that it has a relatively better physical property, lower extensibility and more difficult to break than those of other weaving methods (such as the weft knitting, non-woven, or flat knitting methods), however, at the same time incurring a more complicated process and a higher level of difficulty for automation.

At present, some manufacturers have developed a warp-knitting machine used for weaving an integrally formed garment or sock, and jacquards with different patterns can be woven on a woven fabric. However, this type of warp-knitting machines generally can only feed yarns with a smaller diameter, wherein the diameter falls within a range of 20~150 deniers, so that such warp-knitting machines can be applied for making garments with a smaller yarn diameter. To achieve the appropriate physical properties of the fabric of the vamp, the yarn diameter of the fabric of the vamp generally falls within a range of 200~800 deniers. If the same warp-knitting machine is used for weaving the fabric of the vamp, then the yarn-feeding crochet of the warp-knitting machine may be broken easily due to the large number of deniers.

In view of the problems in the shoe manufacturing process, the inventor of the present invention provides an integrally formed vamp, and reduces the flotsam after the fabric of the vamp is cut, so as to achieve the effect of environmental protection. The present invention further provides a weaving method of a three-dimensional vamp capable of overcoming the problems of unskillful weaving worker, too much flotsam of the vamp fabric and too high labor cost.

BRIEF SUMMARY

In view of the aforementioned problems of the prior art, it is a primary objective of the invention to provide a weaving method of a three-dimensional vamp to overcome the problems of the prior art including unskillful weaving workers, too much flotsam of the vamp fabric and too high labor cost.

To achieve the foregoing objective, the present invention provides a weaving method of a three-dimensional vamp. weaving method of a three-dimensional vamp comprising the steps of: weaving yarn by a warp-knitting machine to form a top vamp by a first part needle bar of the warp-knitting machine which is interactively woven with a bottom vamp formed by a second part needle bar of the warp-knitting machine so as to form a tube-shaped fabric; cutting the tube-shaped fabric to form a sock-shaped fabric; disposing the sock-shaped fabric on a shoe last; and heating the sock-shaped fabric to tighten the sock-shaped fabric in order to seal the shoe last and consequently obtain the three-dimensional vamp.

Preferably, the warp-knitting machine has a crotchet diameter ranging from 1.9 centimeters to 2.5 centimeters.

Preferably, the heated yarn has an irreversible property.

Preferably, the heated sock-shaped fabric seals the shoe last completely.

Preferably, the yarn has a diameter ranging from 200 deniers to 800 deniers.

In summation, the weaving method of a three-dimensional vamp in accordance with the present invention has one or more of the following advantages:

(1) In the weaving method of a three-dimensional vamp in accordance with the present invention, the yarn is mixed with a high shrinkage yarn or a hot melt yarn, wherein the high shrinkage yarn or the hot melt yarn is heat shrinkable to attach onto a shoe last flatly and completely, and the high shrinkage yarn or the hot melt yarn has an irreversible property, so that the heat shrinkable sock-shaped fabric will not resume to its original status prior to heating, so as to achieve the required physical properties of the vamp.

(2) In the weaving method of a three-dimensional vamp in accordance with the present invention, a first part (which is a vamp) and a second part (which is the middle sole) are integrally formed eliminating the need for the manufacturing procedure of cutting shoe materials, and this method also overcomes the problems of an unskillful worker with inaccurate precision and high labor costs.

(3) In the weaving method of a three-dimensional vamp in accordance with the present invention, the integrally formed three-dimensional vamp is adopted to reduce the amount of flotsam of the vamp, so as to reduce the cost of the destroying flotsam, and also achieve the effect of environmental protection.

DETAILED DESCRIPTION

The technical contents and characteristics of the present invention will be apparent with the detailed description of a preferred embodiment accompanied with related drawings as follows. For simplicity, the same numerals are used for the same respective elements in the description of the following preferred embodiments and the illustration of the drawings.

Figure 1:
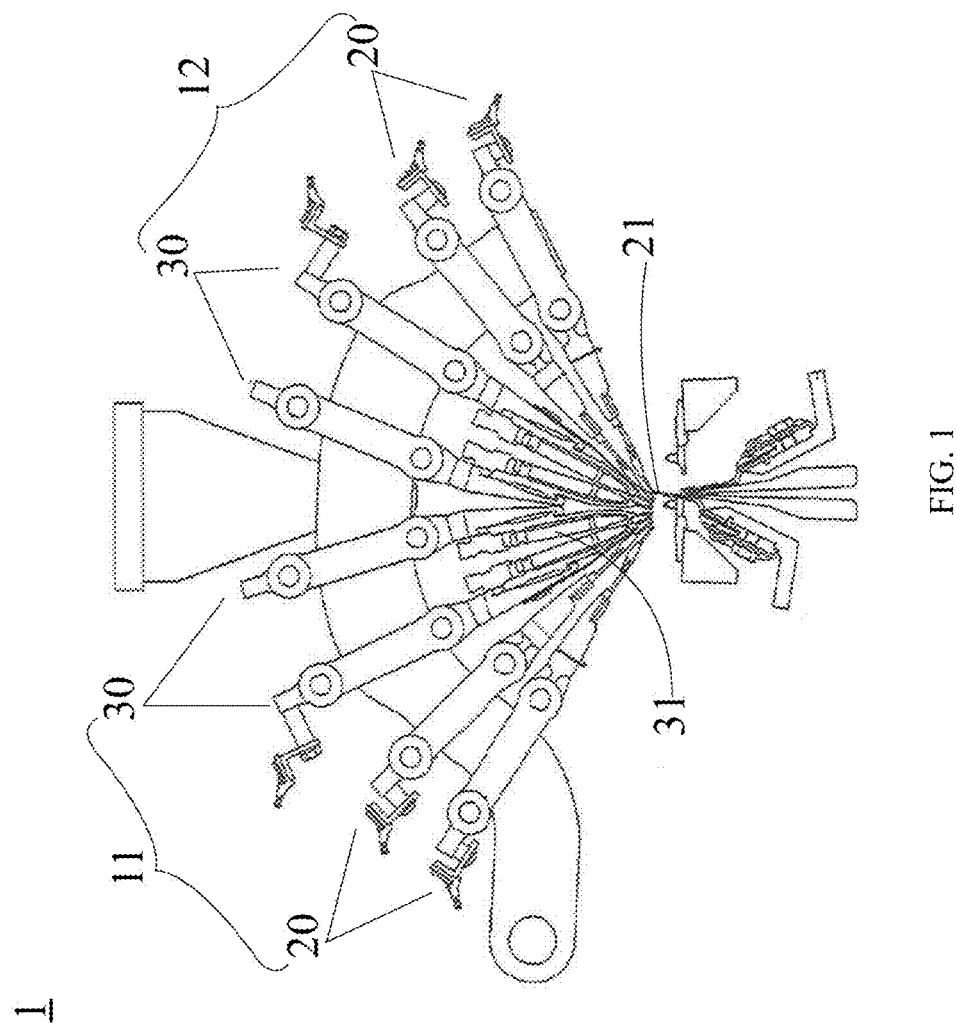
FIG. 1 is a schematic view of a warp-knitting machine applying a weaving method of a three-dimensional vamp in accordance with the present invention.

With reference to FIG. 1 for a schematic view of a weaving method of a three-dimensional vamp applied to a warp-knitting machine in accordance with the present invention, the three-dimensional vamp is produced by weaving yarns by a warp-knitting machine 1. In this preferred embodiment, a pizo double-needle bar warp knitting machine (model number RDPJ6/2) is used, and the middle of the needle of the warp-knitting machine 1 is used as a base, and both sides are a first part needle bar 11 and a second part needle bar 12, wherein each of the first part needle bar 11 and the second part needle bar 12 has two yarn guide weaving seats 20 and two jacquard seats 30. Wherein, the crotchet 21 of the yarn guide weaving seats 20 and crotchet 31 of the jacquard seats 30 have a diameter of 1.9 centimeters ~2.5 centimeters, and the yarn diameter of a yarn feed ranges 200~800 deniers to achieve the required physical properties of the vamp.

The yarn guide weaving seat 20 can be used for weaving the yarn 10 to produce a mesh substrate of the vamp, and then the mesh substrate of the jacquard seat 30 is shifted and woven upwardly to perform a yarn stacking process, so that the mesh substrate can produce a thicker protruding tissue which is the jacquard. More particularly, the type, distribution and organization of the jacquard can be inputted into the warp-knitting machine 1 according to user requirements to produce different jacquard effects. The first part needle bar 11 can be used for weaving a top vamp 111 with the jacquard, and the second part needle bar 12 can be used for weaving a bottom vamp 121 with the jacquard, and the first part needle bar 11 and the second part needle bar 12 are alternately woven to combine the top vamp 111 and the bottom vamp 121 in a seamless manner to produce a tube-shaped fabric 41.

Figure 2:
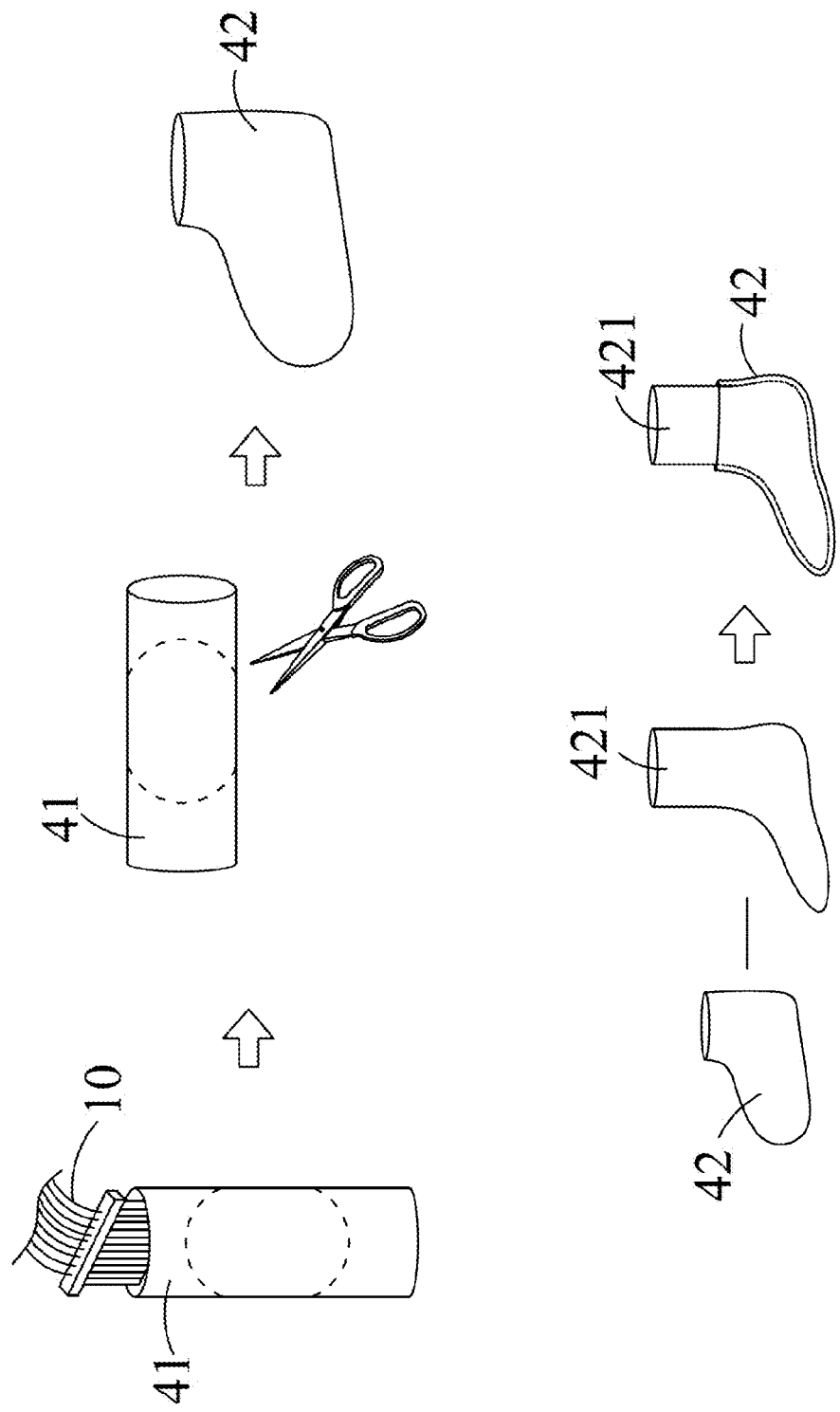
FIG. 2 is a first schematic view of a weaving method of a three-dimensional vamp in accordance with the present invention.
Figure 3:
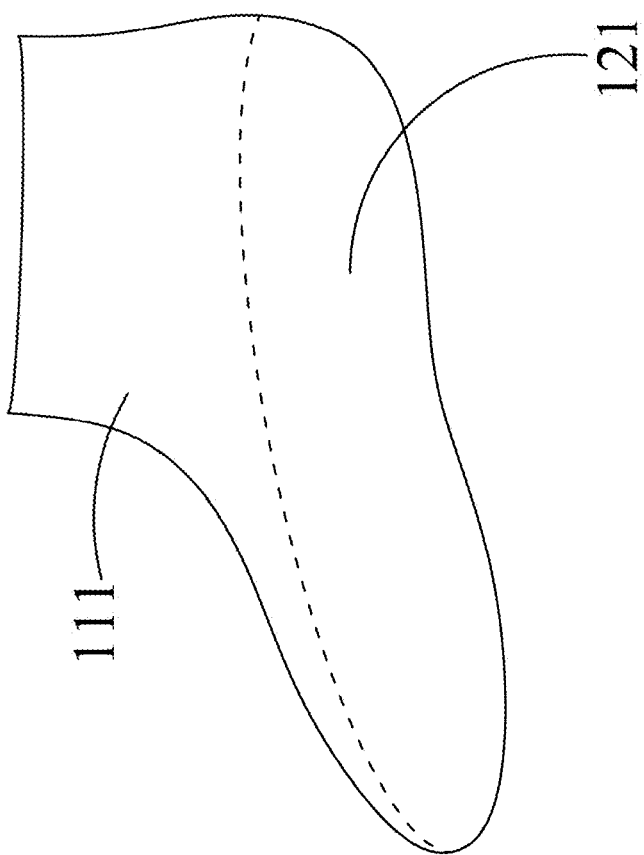
FIG. 3 is a second schematic view of a weaving method of a three-dimensional vamp in accordance with the present invention.

With reference to FIGS. 2 and 3 for the first and second schematic views of a weaving method of a three-dimensional vamp in accordance with a preferred embodiment of the present invention respectively, the warp-knitting machine 1 interactively weaves the top vamp 111 and the bottom vamp 121 to produce a tube-shaped fabric 41, and the tube-shaped fabric 41 can be cut automatically by automated equipment or manually by workers. After the tube-shaped fabric 41 is cut, a more elastic sock-shaped fabric 42 can be obtained. And then, the sock-shaped fabric 42 can be sheathed onto a shoe last 421 of a designed size and then the sock-shaped fabric 42 of the shoe last 421 is heated by high temperature, so that the sock-shaped fabric 42 is tightened after being heated, and attaches onto the shoe last 421 completely. Wherein, the heating temperature can be changed according to the type and property of the yarn. With the heated sock-shaped fabric 42, a three-dimensional vamp with a precise size can be obtained.

It is noteworthy to point out that the yarn used in the weaving method of a three-dimensional vamp of the present invention includes but not limited to a heat shrinkable yarn such as a high shrinkage yarn or a hot melt yarn. Therefore, yarn including a high shrinkage yarn or a hot melt yarn is woven to produce a sock-shaped fabric 42, and the yarn is processed with a heat shrinkable process to achieve an irreversible property. In other words, the shape of the sock-shaped fabric 42 is not fixed before heating, and the shape can be changed slightly. When the sock-shaped fabric 42 is heated, the high shrinkage yarn or the hot melt yarn included therein is tightened and attached closely on the corresponding shoe last 421, the three-dimensional vamp so produced matches the shape of the shoe last 421 exactly, and the heated, tightened and sock-shaped fabric 42 has a dense tissue, and an irreversible property, so as to result in the required physical property of the shoes. In other words, if the size of the shoe last 421 is designed properly, then the three-dimensional vamp manufactured according to the weaving method of the present invention has the advantage of a precise size, so as to overcome the inconsistent quality of the vamps sewed manually.

Figure 4:
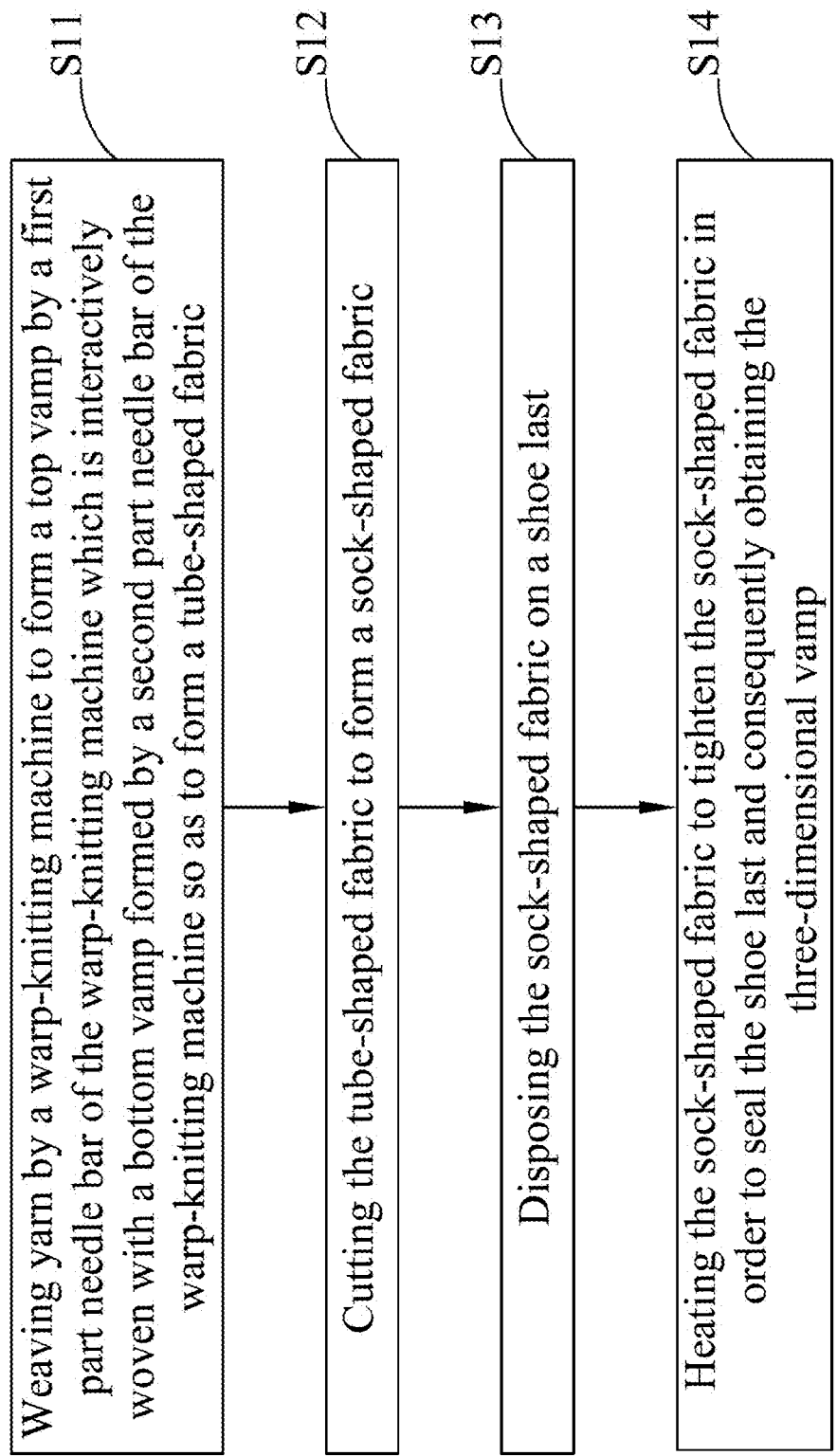
FIG. 4 is a flow chart of an embodiment of the present invention.

With reference to FIG. 4 for a flow chart of a weaving method of a three-dimensional vamp in accordance with a preferred embodiment of the present invention, the weaving method of a three-dimensional vamp comprises the following steps:

S11: Weaving yarn by a warp-knitting machine to form a top vamp by a first part needle bar of the warp-knitting machine which is interactively woven with a bottom vamp formed by a second part needle bar of the warp-knitting machine so as to form a tube-shaped fabric.

Wherein, the yarn includes a high shrinkage yarn or a hot melt yarn and has a diameter of 200~800 deniers. Wherein, the warp-knitting machine has a crotchet diameter of 1.9~2.5 centimeters, but the invention is not limited to such arrangements only.

S12: Cutting the tube-shaped fabric to form a sock-shaped fabric.

S13: Disposing the sock-shaped fabric on a shoe last.

S14: Heating the sock-shaped fabric to tighten the sock-shaped fabric in order to seal the shoe last and consequently obtaining the three-dimensional vamp.

Wherein, the heating temperature can be changed according to the type and property of the yarn.

In summation of the description above, the weaving method of a three-dimensional vamp of the present invention mainly uses the first part needle and the second part needle of the warp-knitting machine for interactive weaving to combine the top vamp to the bottom vamp in a seamless manner, so as to form a tube-shaped fabric. After the tube-shaped fabric is cut into the sock-shaped fabric, the sock-shaped fabric is sheathed on the shoe last of the corresponding size, and the high-temperature heating method is used for tightening the yarn to seal tightly and flatly onto the shoe last, so as to obtain the precise size of the three-dimensional vamp. In addition, the yarn such as the high shrinkage yarn or the hot melt yarn has the irreversible property after the yarn is heated, so that the heat-shrinkage yarn can achieve the required physical properties of the shoes. More particularly, the weaving method of a three-dimensional vamp of the present invention integrally forms the vamp, and thus not only reducing the shoe materials used, sewing time, labor and cost of the traditional manual manufacturing process, but also achieving the effect of environmental protection.

What is claimed is:

1. A weaving method of a three-dimensional vamp, comprising the steps of:
    weaving yarn by a warp-knitting machine to form a top vamp by a first part needle bar of the warp-knitting machine which is interactively woven with a bottom vamp formed by a second part needle bar of the warp-knitting machine so as to form a tube-shaped fabric;
    cutting the tube-shaped fabric to form a sock-shaped fabric;
    disposing the sock-shaped fabric on a shoe last; and
    heating the sock-shaped fabric to tighten the sock-shaped fabric in order to seal the shoe last and consequently obtain the three-dimensional vamp.

2. The weaving method of a three-dimensional vamp according to claim 1, wherein the warp-knitting machine has a crotchet diameter falling within a range from 1.9 centimeters to 2.5 centimeters.

3. The weaving method of a three-dimensional vamp according to claim 1, wherein the heated yarn has an irreversible property.

4. The weaving method of a three-dimensional vamp according to claim 1, wherein the heated sock-shaped fabric seals the shoe last completely.

5. The weaving method of a three-dimensional vamp according to claim 1, wherein the yarn has a diameter falling within a range from 200 deniers to 800 deniers.

* * * * *